No. 705,603. Patented July 29, 1902.
S. NIELSEN.
REVERSING MECHANISM.
(Application filed Feb. 14, 1902.)
(No Model.)

WITNESSES:
K. V. Donovan.
E. M. Wells.

INVENTOR
Stefanus Nielsen
BY Jacob Felbel
ATTORNEY

UNITED STATES PATENT OFFICE.

STEFANUS NIELSEN, OF BROOKLYN, NEW YORK.

REVERSING MECHANISM.

SPECIFICATION forming part of Letters Patent No. 705,603, dated July 29, 1902.

Application filed February 14, 1902. Serial No. 94,096. (No model.)

*To all whom it may concern:*

Be it known that I, STEFANUS NIELSEN, a citizen of Norway, and a resident of the borough of Brooklyn, city of New York, in the county of Kings and State of New York, have invented certain new and useful Improvements in Reversing Mechanisms, of which the following is a specification.

My invention relates more particularly to reversing mechanisms for gas and gasolene engines, and has for its main object to provide simple and efficient means whereby the motion of the shaft or member driven constantly in one direction may cause another shaft or member to revolve in the same direction or reversely, as may be desired.

To this main end and object my invention consists in certain features of construction and combinations of devices, as hereinafter more fully described, and particularly pointed out in the appended claims.

Figure 1:
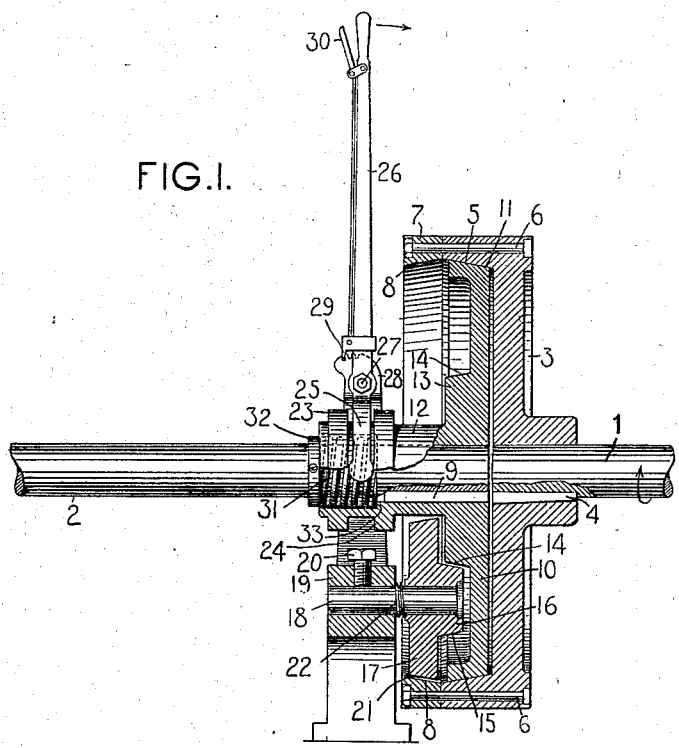
Figure 2:
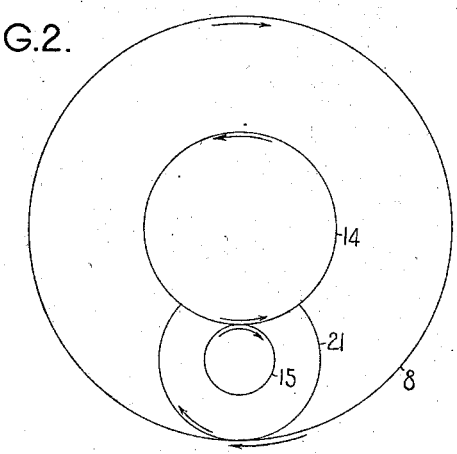

In the accompanying drawings, Figure 1 is a central sectional view, partly in elevation, of a reversing mechanism embodying my invention; and Fig. 2 is a diagrammatic view showing the motions of certain of the parts or members when the reversing action is taking place.

1 designates a driving-shaft which is or may be the motor-shaft of a gas or gasolene engine, and, as usual, this shaft is driven constantly in one direction only, as indicated by the arrow thereat.

2 designates a shaft driven by the shaft 1 normally in the same direction as the latter; but when occasion requires said shaft 2 may be driven in the opposite or reverse direction. To the shaft 2 may be attached the screw-propeller of a launch or other device to be driven by the engine. The shafts 1 and 2 are arranged in line with each other and are supported in suitable bearings. (Not shown.)

A wheel 3, preferably the fly-wheel of the engine, is secured to the outer end of the shaft 1 by means of a key or feather 4, and this wheel interiorly is formed with a beveled surface 5, which extends all around the wheel and which is inclined downwardly and inwardly. Preferably attached by bolts and nuts 6 to the outer face of the wheel 3 is a ring 7, which is likewise provided interiorly with a beveled face 8, that inclines in a direction opposite to that of the face 5. The wheel 3 and the ring 7 turn together as one, and although shown as made of two separate parts they may, if desired, be made in one piece, though the construction shown is preferred, as being more convenient of manufacture.

At the inner end of the driven shaft 2 is slidably secured by a key 9 a clutch, wheel, or disk 10, whose outer periphery is beveled at 11 to match the interior face 5 of the wheel 3, and normally these two surfaces 5 and 11 are held in frictional contact and couple together the shafts 1 and 2.

Between the elongated hub 12 of the clutch, wheel, or disk 10 and the periphery thereof is formed or provided a circular boss 13, whose periphery is beveled at 14 in a direction opposite that of the periphery or face 11. This beveled face 14 is adapted to frictionally engage the matching beveled face 15 of a boss 16, formed or provided on the inner side of a wheel or disk 17, loose on a stud or axle 18, which is held in bearings 19 by a set-screw 20. The periphery of the wheel or disk 17 is beveled at 21 in the direction of the bevel 8 on the inside of the ring 7, so as to engage the same frictionally when reverse action is to take place. Surrounding the stud or axle 18 is a coiled spring 22, which at one end presses against the bearing 19 and at its opposite end against the wheel or disk 17, so as to press the latter forward and keep the beveled surfaces 21 and 8 normally out of engagement, the inner end of the stud 18 being headed and the boss 16 recessed to limit the inward movement of the wheel under the pressure of the spring.

The elongated hub or bearing 12 of the clutch 10 and boss 13 is flanged exteriorly, as at 23, and grooved, as at 24, and within the groove is arranged a fork 25, formed at the lower end of a lever 26, which is pivoted at 27 in a stand or support 28. The lever is provided with a latch device 29, adapted to engage a notch in the stand and hold the lever normally in non-working position; but when the handpiece 30 of the latch is moved toward the handle of the lever the latch is disengaged, and when the lever is swung in the direction of the arrow the fork causes the clutch 10 to slide outwardly or in a direction away from the shaft 1.

Surrounding the shaft 2 and within the hub or sleeve 12 is a spiral spring 31, whose outer end bears against a collar 32 on the shaft 2 and whose inner end bears against a flange 33, formed interiorly of the sleeve 12, and said spring is thus adapted normally to press the clutch 10 toward the wheel 3 and maintain the beveled surfaces 5 and 11 in frictional engagement. Thus it will be seen that the motion of the driving-shaft 1 and the wheel 3 fast thereon will normally communicate motion to the clutch 10 and that the latter will impart this motion to the shaft 2 and drive it in the same direction as the shaft 1.

When it may be desired to reverse the motion of the shaft 2, the operator will swing the lever 26 in the direction of the arrow shown at Fig. 1, and the surface of the clutch 10 will be moved out of frictional engagement with the interior surface of the wheel 3, and the surface 14 of the boss 13 will be brought into engagement with the surface of the boss 16, and as the sliding motion of the clutch 10 is continued under the action of the reversing-lever the surface of the wheel 17 is brought into engagement with the interior surface of the ring or wheel 7, the wheel 17 sliding outwardly slightly on its stud against the tension of its spring 22 to enable such engagement to be effected. When this has been accomplished, the ring or wheel 7, which rotates always in one direction with the wheel 3 and shaft 1, will operate to drive the wheel 17, and the boss 16 thereon being in frictional contact with the boss 13 on the clutch or disk 10 will drive the latter, and the clutch 10 being keyed to the shaft 2 will rotate said shaft, but in a direction opposite to that of the rotation of the shaft 1 and the reverse of that which the shaft 2 had previously been rotating. When the lever is released, the spring 31, which was compressed during the operation of separating the clutch 10 and wheel 3, will act to restore said clutch 10 into engagement with the wheel 3 and to break the frictional engagement between the boss 13 and the boss 16, while at the same time the wheel 17 will be independently moved out of frictional engagement with the ring 7 by the reaction of its spring 22, and thereafter, by reason of the recoupling of the wheel 3 and clutch 10, the shafts 1 and 2 will rotate together in the same direction.

If desired, the spring 22 may be omitted, although I prefer it to take the wheel 17 out of engagement with the ring 7, so as to avoid useless friction and wear on said wheel 17 when the parts are running normally.

It will be observed that the diameters of the wheels 7 and 17 and of the bosses 16 and 13 are so proportioned as that the speed of the driven shaft 2 when reversed will be the same as when running direct and the same as the driving-shaft 1; but, if desired, this proportion may be changed, so as to have the speed of the driven shaft greater or less when reversed than when rotating in the same direction as the motor or driving shaft.

Referring to the diagrammatic view, Fig. 2, it will be observed that the parts are shown in the relation which they bear to each other when they have been adjusted for effecting the reverse action of the shaft 2. The large outer circle represents the surface 8 of the ring 7, the inner circle 21 the surface of the wheel 17, which engages said ring, the circle 15 the periphery of the boss 16, and the circle 14 the periphery of the boss 13, which engages the boss 16, and from this view it will be observed that when the surface 8 is traveling in the direction of the arrow thereat and which is the constant direction of this part and of the shaft 1 a reverse motion will be communicated to the surface 14 of the boss 13, which latter is fast on the driven shaft 2 through the several intermediate friction-surfaces 21 and 15, an arrow being shown at each part to represent the direction of travel thereof.

While I prefer to make the wheel 3 the flywheel of the engine, it may nevertheless be separate and distinct therefrom, and in some cases this wheel may be utilized as a belt-pulley. It will also be understood that my invention may be used for other purposes than the shafts of gas or gasolene engines, although it has been designed especially therefor, and in such other cases the driving and driven members may be parts which are not shafts, but pulleys or other devices.

The wheels 3 and 10 may be regarded as friction-clutch members, and the parts 7, 13, 16, and 17 as mere friction-wheels, and although I have shown some of these parts as made integral with others it will be understood that they may be made separate therefrom and otherwise arranged without departing from the gist of my invention.

What I claim as new, and desire to secure by Letters Patent, is—

1. In a reversing mechanism, the combination of a driving-wheel as 3 rotating constantly in one direction, a friction-clutch as 10 normally in engagement therewith and driven thereby, a friction-wheel as 7 also constantly driven with the first-mentioned wheel, a friction-wheel as 13 adapted to be driven always with the friction-clutch, a friction-wheel as 17 normally disengaged from the wheel 7 but adapted to be driven thereby, a friction-wheel as 16 adapted to be driven with the wheel 17 and normally disengaged from the wheel 13 but adapted to drive the same and the clutch 10, and means for disengaging the clutch 10 from the wheel 3 and causing engagement between the wheels 13 and 16 and the wheels 17 and 7.

2. In a reversing mechanism, the combination of a constantly-driven wheel as 3, a friction-clutch as 10, a spring for holding said clutch normally in engagement with the wheel 3, a friction-wheel as 13 connected with the clutch 10, a friction-wheel as 7 connected with the wheel 3, a friction-wheel 17 adapted to engage with the wheel 7, a friction-wheel as 16 adapted to engage with the wheel 13, and a lever for breaking the engagement between the clutch 10 and wheel 3 and causing engagement in succession between the wheels 13 and 16 and the wheels 17 and 7.

3. In a reversing mechanism, the combination of a driving-shaft, a wheel 3 secured thereon to revolve always therewith, a driven shaft 2, a friction-clutch connected to revolve said shaft and also to slide thereon and arranged normally to frictionally engage said wheel 3, a friction-wheel as 7 connected to the wheel 3, a friction-wheel as 17 mounted on a stud or axle, a friction-wheel as 16 connected to said wheel 17, a friction-wheel as 13 connected with the friction-clutch 10, and means for moving the clutch 10 on its shaft to disengage it from the wheel 3 and cause frictional engagement between the wheels 13 and 16 and the wheels 7 and 17 so as to reverse the motion of the shaft 2.

4. In a reversing-gear, the combination of a constantly-driven shaft, a wheel 3 having an interior beveled surface, a friction-clutch 10 having a beveled periphery to match said interior beveled surface and normally in engagement therewith, a driven shaft 2 upon which said clutch 10 is secured and upon which it is adapted to slide, a spring for maintaining the surfaces of the clutch 10 and wheel 3 normally in engagement, a ring 7 connected to the wheel 3 and having an interior surface beveled in a direction opposite to that of the wheel 3, a wheel 17 having its periphery beveled to match that of the ring 7, a boss 16 having a beveled periphery, and a boss 13 on the clutch 10 having a beveled periphery to match that of the boss 16, and means for sliding the clutch 10 on its shaft and breaking the frictional engagement thereof with the wheel 3 and causing frictional engagement between the bosses 13 and 16 and the wheel 17 and the ring 7.

5. In a reversing mechanism, the combination of a constantly-driven shaft having secured thereto a wheel 3 having an interior beveled friction-surface, a ring 7 secured to said wheel and having an interior friction-surface beveled in the opposite direction, a stud or axle, a wheel 17 on said stud or axle and having its periphery beveled to match the interior bevel of said ring, a boss 16 on said wheel 17 and having a beveled periphery, a spring for said wheel 17, a clutch 10 having a beveled periphery to match that of the wheel 3 and having a boss 13 with a beveled periphery to match that of the boss 16, a shaft 2 upon which said clutch 10 is mounted, a hub or sleeve connected to said clutch 10, a spring within said hub or sleeve for holding said clutch normally in frictional engagement with the wheel 3, and a lever mechanism connected to said hub or sleeve for moving said wheel against the tension of its spring and to disengage it from the wheel 3 and cause frictional engagement between the bosses 13 and 16 and the ring 7 and wheel 17.

Signed at the borough of Manhattan, city of New York, in the county of New York and State of New York, this 13th day of February, A D. 1902.

STEFANUS NIELSEN.

Witnesses:
K. V. DONOVAN,
E. M. WELLS.